Patented Jan. 29, 1946

2,393,871

UNITED STATES PATENT OFFICE 2,393,871

VULCANIZED RUBBER HYDROHALIDE

Howard F. Reeves, Jr., and Troy M. Andrews, Weeks, La., assignors to Bay Chemical Company, Inc., New Orleans, La., a corporation of Louisiana No Drawing. Application December 22, 1941, Serial No. 424,088

10 Claims. (Cl. 260—771)

This invention relates to improvements in rubber hydrohalide and to improved processes and improved products involving rubber hydrohalide. For purposes of illustration reference will be made to rubber hydrochloride.

Rubber hydrochloride has been produced by chemical addition of HCl to rubber. The usual process has been to dissolve the rubber and to introduce HCl into the solution of rubber, but there have been rather ineffective proposals to treat solid rubber with HCl. Processes that involve dissolving the rubber entail considerable difficulty in maintaining adequate concentration of HCl and also in combatting the extreme viscosity of solutions of rubber. There is difficulty, further, in removing excess reagent from the product so that one of the objections to rubber hydrochloride heretofore has been its acidic tendencies. Moreover previous rubber hydrochlorides have deteriorated rather rapidly on exposure to ultra-violet rays, and therefore have possessed undesirably low resistance to weathering or exposure to ordinary light.

In previous ways of forming rubber hydrohalide from solid rubber the liquids required have been expensive and frequently volatile so that suitable manufacturing apparatus has been more complicated and more expensive than is desirable. For example, costly ethers and esters that do not swell rubber have been required.

An important purpose under this invention is to produce rubber hydrohalide having improved properties, even many properties opposite from prior products that have been termed rubber hydrohalide.

An important object with which the invention is concerned is to form rubber hydrohalide containing sulphur or other vulcanizing agents and having the various improved properties herein set forth.

A specific object is to obtain rubber hydrohalide that is resistant to solution by liquids that have been considered excellent solvents for previous rubber hydrohalides. Also a purpose is to produce rubber hydrohalide that is dependably non-acidic or does not yield acid during its period of usefulness. A further purpose specifically is to produce rubber hydrohalide that possesses high tensile strength.

Another important object is to carry out the requisite chemical reactions with apparatus that may be exceedingly simple and with reagents that are relatively inexpensive and relatively easy to handle during processing operations. Another object is to execute the requisite chemical reactions with relative rapidity in comparison with previous operations.

A further purpose is to obtain methods of processing that shall yield finished products directly in the form or of the nature desired for special purposes. For example, an object is to treat a preformed article of rubber in such way that the form and size are maintained in the ultimate rubber hydrohalide product. Particularly an object in this connection is to control the degree of hydrohalogenation so that the finished product whether preformed or not may contain a desired amount of hydrogen halide.

Among these special purposes for example are the preparation of composite articles comprising rubber hydrohalide bonded to metal or composite articles of rubber hydrohalide bonded to rubber. Thus a composite article having an interior of rubber with a bonded surface of rubber hydrohalide is extremely useful for protecting gasoline tanks so that the tank is self-sealing against puncture by bullets or other missiles. Such an article is even more useful where under this invention the composite rubber surface is itself bonded to metal such as might compose the walls of a gasoline tank or fuel line.

Another illustration of the considerable scope of this invention is found in a sheet of rubber hydrohalide that is exceedingly thin and light color, but strong and capable of being stretched and subsequently having the property of contracting on heating. Such an article, for example, is a seal or wrapper that is strong and tight fitting about goods contained therein so as to be capable of replacing other wrapping or protective materials. It could be used in airplane construction as outer covering, by being contracted upon the frame by heat.

Considerable scope and varied objects further than these specifically mentioned will appear in further description of the principles and preferred practices of this invention.

According to this invention many of the benefits sought are obtainable by applying hydrogen halide to solid vulcanized rubber in the presence of a penetrant that swells the rubber. Preferably the penetrant does not dissolve the resulting rubber halide.

In most favored practice under this invention the reagent hydrogen halide and the penetrant to swell the rubber are both applied in gaseous form to the solid vulcanized rubber, with the result that rapid and effective conversion of the vulcanized rubber is obtained to yield the desirable type of rubber hydrohalide herein described.

Another factor promoting desired results under this invention is stretching the rubber hydrohalide, preferably in the presence of the swelling penetrant used during reaction, to obtain improved tensile strength and also improved resistance to light and to ageing.

Our stretched product possesses another highly desirable property not found in the unstretched material. Atttempts to bend the unstretched vulcanized-rubber hydrochloride at temperatures of −20° to −30° C. caused the material to break due to brittleness at this temperature. However, strips or hose of the same sample when stretched to 3 to 4 times the original length, showed no tendency to become brittle and break on bending at temperatures below −64° C. It is obvious that this low-temperature resistance of the stretched material is advantageous when use of the material demands flexibility at extremely low temperatures.

Thus, this process provides easy means for converting ordinary rubber products to products of greater resistance to chemicals, solvents, ageing, cold, distortion, permeation of gases, etc.

A further practice is to assure freedom from acid by application of gaseous ammonia to the hydrohalide that is produced in the presence of a rubber-swelling penetrant. This acid-free product contains ammonium halide produced in situ.

In this description and in the claims it will be convenient to refer to this product of treating vulcanized rubber with hydrogen halide as vulcanized-rubber hydrohalide. Further, hydrogen chloride will be taken as illustrative but the term hydrogen halide is intended to embrace also hydrogen iodide and hydrogen bromide, though hydrogen fluoride is excluded from this term.

This invention can best be illustrated by discussion of preferred practices and by illustrative examples. These are for the purpose of illustration and not restrictive of the invention inasmuch as this invention may be practiced otherwise than in these specific embodiments.

Previous attempts to obtain satisfactory products by treating solid vulcanized rubber with hydrogen chloride have involved contacting the rubber with liquid that not only would not dissolve rubber, but would avoid swelling of the rubber. Moreover it has been supposed that such liquid should be a good solvent of the hydrogen halide reagent. The present invention definitely swells the vulcanized rubber.

As an example of treatment under this invention, strips of soft vulcanized rubber $\frac{3}{32}$ inch thick, weighing 40 grams and containing about 2 percent sulphur were suspended in an acid-proof reaction vessel. This vessel was of simple design, capable of being evacuated and of admitting reagent gas under controlled pressure. The vessel was capable also of containing liquid if desired, as a source of gas, but so that the rubber could be maintained out of contact with the liquid. Air was removed from the reaction vessel to an absolute pressure of about 2 centimeters of mercury. Then 80 cubic centimeters of benzene were introduced, but out of contact with the rubber and without admitting air. Then hydrogen chloride was added to the reaction vessel until the pressure therein became atmospheric. Hydrogen chloride was consumed and as consumed was replaced so as to maintain atmospheric pressure. The period of treatment extended for 30 hours at a temperature from 20 to 30 degrees C. Then the vessel was again evacuated and dry ammonia gas added. After about 4 hours contact with the ammonia, the strips changed from almost a black color to a light brown color and were semi-translucent. On removal from the reaction vessel the acid-free vulcanized-rubber hydrochloride containing penetrant weighed 81 grams. After drying 6 hours at 65° C., this material weighed 66 grams and contained 28.1 percent chlorine.

The time of reaction varies according to the thickness of the object to be converted. Soft vulcanized sheets $\frac{3}{32}$ inch thick containing 2.4 percent sulphur have been converted to the vulcanized hydrochloride in a period as short as 24 hours. Chlorine analysis on the interior and on the exterior of a given converted sheet showed a chlorine content of 26.9 and 26.8 percent, respectively. By permitting the vulcanized rubber to stand over benzene as penetrant until it takes up approximately its own weight of penetrant at about 20 to 30° C. prior to hydrochlorination thicknesses of $\frac{3}{32}$ inch can be converted completely to the vulcanized hydrochloride in about 40 hours.

Strips of soft vulcanized rubber $\frac{3}{32}$ inch thick containing 2.3 percent sulphur and weighing 20 grams were suspended in an acid-resistant reaction vessel. Air was removed from the vessel and 50 cc. of chloroform added. The pressure within the vessel was then brought to atmospheric by the addition of hydrogen chloride gas. Hydrogen chloride was added to the vessel as used up by the rubber for a period of 48 hours. The penetrant-containing reacted material weighed 49.5 grams on removing from the reaction vessel. This material was completely converted to the hydrochloride and had the same chemical and physical properties as the material obtained with benzene as penetrant.

It is to be understood that our reactions may be carried out without the use of vacuum. We may impregnate the rubber with penetrant in a closed vessel equipped with a circulating or agitating apparatus for the gaseous vapors of the penetrating agent. Air in the reaction vessel may be removed even more completely by flushing out with hydrogen chloride than by evacuation and after completion of hydrochlorination, the hydrogen chloride may be displaced by air or by ammonia for neutralization. Circulation or agitation of the gases may be employed during the reaction.

Observation of this vulcanized-rubber hydrochloride will serve to distinguish some of its peculiar properties from previous rubber hydrochlorides. For example, a phenomenon that does not occur to any extent with rubber hydrochloride from unvulcanized rubber is that after about 20 hours reaction time, droplets appear on the outer surface of the sheets undergoing treatment. It will be recalled that the reagent and the penetrant both are gaseous preferably. The droplets that appear are droplets of the penetrant. Thus the benzene penetrant for example is being expelled automatically and this expulsion illustrates the peculiar insolubility of the vulcanized-hydrochloride in benzene. This automatic expulsion of the penetrant is advantageous because it facilitates removal of penetrant from the product. Heretofore this has been difficult because of the tendency of previous rubber hydrochlorides to dissolve or to retain the penetrant. Consequently in this process and with this product penetrant may be removed relatively quickly and simply by exposure to air, particularly with slight elevation of temperature.

Not only is the insolubility of this vulcanized-hydrochloride illustrated by the expulsion of droplets after some period of reaction, but it is illustrated further by the fact that the product does not dissolve nor even become sticky on treatment with boiling benzene or chloroform. These are two of the best known solvents for previous rubber hydrochlorides.

The product, however, is non-thermoplastic but is stable to heating and does not become sticky below 150° C. The material does become more flexible with increase in temperature but does not show plastic flow. It does not seal to itself when heater under pressure to its decomposition temperature of about 200° C.

On treatment by benzene or chloroform however the product alters and loses its strength but retains its form, though on drying its strength is regained. This is a useful and peculiar property that is advantageous because it permits this product to be converted to a finely divided condition by rolling or milling while in weakened form.

Gasoline, petroleum naphtha or lubricating oil cause very little change in the vulcanized-rubber hydrochloride. A maximum gain in weight of 2.6 percent after two full days contact with these liquids at 22° C. is the most that has been observed.

Another peculiar property of this product and an extremely useful property is that vulcanized-rubber hydrochloride can be stretched and by stretching is given greater tensile strength than the original unstretched material. Presumably this straining of the product arranged the molecules out of random orientation into more parallel order. Preferably this stretching is executed while the product yet contains penetrant; with acid present or after acid has been neutralized. The stretching can be accomplished by applying a load slowly to the material while it contains about 20 percent benzene. Or the stretching can be accomplished by warming the material to about 80° C. and applying a load slowly.

Strips of vulcanized-rubber hydrochloride can be given a permanent stretch of from 2 to 7 times the original length. An important quality of this stretched product is that of shrinking on heating from 80 to 100° C. In fact a sheet or strip on such heating will return almost to its original unstretched dimensions. This property is particularly useful in securing a tight-fitting wrapper or container, for the vulcanized-rubber hydrochloride may be stretched and then by this heating may be shrunk upon the object involved.

As an example of this property of imparting strength by stretching the vulcanized-rubber hydrochloride, the following procedure may be noted: Strips of acid-free vulcanized-rubber hydrochloride containing 22 percent benzene penetrant were stretched slowly from an original length of 7 inches to a length of 20 inches and air-dried. This material contained 26.8 percent chlorine and 1.7 percent sulphur. Before stretching and after drying, the sample broke under an average load of 1600 pounds per square inch. However when stretched and dried the sample supported an average load before breaking of 10,400 pounds per square inch.

Another peculiar property of this vulcanized-rubber hydrochloride is its resistance to deterioration on exposure to ultra-violet light. Thus samples of vulcanized-rubber hydrochloride were exposed continuously at a distance of 15 inches from a standard G. E. S-4 lamp, which emits ultra-violet light, for a period of six weeks. At the end of that time they showed only surface checking on bending, whereas ordinary rubber hydrochloride after several days exposure to the same light is brittle and disintegrates characteristically on flexing. Apparently the surface of this new product protects the interior of the sample from attack by the ultra-violet rays.

Another feature of this invention is attainment of a neutral product by applying ammonia gas after completion of the hydrochlorinating reaction. Preferably ammonia gas is applied while the product contains a penetrant for thus the neutralization action is more rapid and more positive. There are many advantages both in process and in product that result from this feature of the invention. Previous methods attempting neutralization of solid rubber hydrochlorides have generally used milling with solid neutralizers. The advantages of introducing ammonia gas directly into the vulcanized hydrochloride while it contains penetrant will be illustrated by several examples.

It may be observed first of all NH₄Cl is produced in situ in the product. The resulting product of neutralization NH₄Cl is harmless to the product and does not interfere with removal of penetrant.

It may be useful to describe at once the simplicity of testing this product to determine whether free acid is present. In this test, 5 grams of thin strips of the product to be tested are placed in 50 cc. of neutral chemically pure benzene. This mixture after standing for 5 or 6 hours at room temperature is extracted with 25 cc. of distilled water. The acidity or pH of the water is then determined by any of the usual methods. If the pH is on the acid side then the vulcanized-rubber hydrochloride contained free acid and is capable of liberating that acid. If the pH is on the basic side the free acid has been neutralized effectively and the vulcanized-rubber hydrochloride contains traces of free ammonia, which is harmless. Dry vulcanized-rubber hydrochloride of the present process but prepared without ammonia neutralization usually yields a water solution having a pH of about 5. The ammonia-neutralized material gives a pH of about 9 even after a month of ageing. This demonstrates that the present new material remains chemically stable, non-corrosive and acid-free. It thereby has overcome one of the most serious objections to former rubber hydrochlorides.

Another advantage of ammonia neutralization lies in control in formation of special products composed of multiple layers. For example, a sheet may be prepared in which some controlled depth of the center remains unconverted to vulcanized-rubber hydrochloride. For example, this controlled formation of layers, a sheet of vulcanized rubber $\frac{3}{32}$ inch thick containing 3 percent sulphur weighing 75 grams was suspended in a suitable vessel. The vessel was evacuated and then filled with hydrogen chloride at atmospheric pressure. Then 50 cc. of benzene were added, but without contacting the liquid with the rubber. Hydrogen chloride was replenished as consumed for a period of 48 hours. Then the vessel was evacuated again and filled with gaseous ammonia. After contact with the ammonia for 8 hours the sheet was removed and dried. The product then exhibited outer layers of vulcanized-rubber hydrochloride each about 0.025 inch thick while the inner section retained substantially its original composition properties. Thus it appears that the hydrogen chloride gas reacts rapidly and substantially completely immediately on contact with the rubber in presence of swelling penetrant and then that the reaction proceeds to the interior gradually as hydrogen chloride infiltrates through the converted exterior surfaces.

Such a multiple sheet is useful for various purposes. Notably it is found to be self-sealing against gasoline leaks and therefore is useful to protect gasoline tanks or feed lines or the like. To demonstrate this self-sealing ability of this multiple layers product a sheet $\frac{3}{32}$ inch thick was placed between flanges across the end of a pipe 3 inches in diameter and 15 inches long. The pipe was placed vertically with the sheet at the bottom and filled with gasoline; then the sheet was punctured with a round spike $\frac{3}{8}$ inches in diameter. The gasoline did not escape because the sheet remained flexible and because of some swelling of the middle rubber layer on contact with the gasoline. It may be added that both outer surfaces of the sheet were resistant to gasoline. Thus a tank of this material would not be affected adversely by spillage of gasoline. The rubber interior of the sheet moreover is protected against weathering and other destructive influences. More than this, the hydrochloride layers are relatively stiff and so help to maintain a fairly firm integral structure that does not tend to deform or to collapse like rubber and yet retains considerable ability to yield without rupture under the influence of external forces. A gasoline container constructed of this multiple sheet is exceedingly useful.

The present process and this new multiple layer sheet are useful further for bonding to metal. For example, vulcanized rubber sheets $\frac{3}{16}$ inch thick were bonded to metal, then the bonded rubber exposed for 48 hours to a mixture of benzene gas and HCl gas. An outer layer of vulcanized-rubber hydrochloride over $\frac{1}{32}$ inch thick was formed. Then the product was neutralized with ammonia gas. There appeared no subsequent corrosion of the metal, so evidently the product had been neutralized effectively and was not acid.

From these various illustrations it will be evident that articles may be prepared of vulcanized rubber in various forms and sizes and then converted by the treatments described into vulcanized-rubber hydrochloride. The degree or depth of conversion of the vulcanized rubber may be controlled by regulating time or temperature or the admission of ammonia. There need be no substantial change of form or size; for example, by adding the penetrant to the reaction vessel containing the vulcanized rubber and hydrogen chloride slowly over an initial reaction period of 20 hours objects have been converted with an increase of only 3 percent of their original length.

The vulcanized rubber used under this invention may contain varying amounts of vulcanizing agents whether sulphur or other agents. Ordinary commercial soft vulcanized rubber is exceedingly well adapted for this treatment. Vulcanized rubber containing fillers that are not deteriorated by hydrogen halide is useful and also the rubber may contain other substances than the vulcanizing agents, for example, may contain zinc oxide, stearic acid, organic accelerator and antioxidant. Vulcanized rubber may also contain plasticizers such as paraffin, dibutyl phthalate, and such others as desired for flexibility.

This invention is not limited to the use of soft vulcanized rubber or vulcanized rubber of any particular sulphur content.

For example, we may convert hard vulcanized rubber containing from 15 per cent to 25 percent sulphur to the hydrochloride by our process. Such a product has been prepared from a hard vulcanized rubber containing 22.3 percent sulphur. This product containing 12.4 percent chlorine is somewhat softer and more flexible than the starting material while rubber hydrochloride prepared from low sulphur vulcanized rubber is normally harder than the starting material.

This serves to illustrate that any residual unsaturation in vulcanized rubber can be utilized for combination with hydrogen chloride by our process.

The amount of sulphur contained in the vulcanized rubber may affect the tensile strength of the unstretched product and affects the amount of halogen added. For example, the following table represents results of three different tests on soft vulcanized rubber hydrochloride sheets, each $\frac{3}{32}$ inch thick:

| Run No. | Percent S | Percent Cl | Tensile strength of unstretched material, lbs. per square inch |
|---|---|---|---|
| 1 | 0.75 | 27.5 | 3,500 |
| 2 | 3.00 | 27.3 | 3,200 |
| 3 | 5.30 | 25.6 | 3,000 |

The above sulphur content is based on the original vulcanized rubber sheets.

There is no idea of limiting the scope of this invention by any theory, but it may be desirable to indicate the probable change that occurs under this invention. Rubber is an exceedingly complex substance, but its molecular composition expressed in simplest terms is represented by the empirical formula $C_5H_8$ or by the type formula $C_nH_{2n-2}$. As thus indicated rubber is considered to be an unsaturated hydrocarbon. It thus is capable of adding on reagents that act on double bonds. In vulcanization the type of action is the addition of sulphur to some of the double bonds to form an intermediate product.

Under this invention the final product is attained by supplementing the sulphur content of the vulcanized rubber with the addition of hydrogen halide. The extent and nature of this addition however is determined largely by the degree and rate and intimacy of permeation of the rubber molecule by the hydrogen halide. Under this invention, in which the vulcanized rubber in solid form is swelled by gaseous penetrant, the introduction of hydrogen halide is particularly effective and yields the product herein described. This introduction of hydrogen halide into vulcanized rubber overcomes what has previously been considered difficult, overcoming with hydrogen halide the residual unsaturation of vulcanized rubber. It may be emphasized that this vulcanized-rubber hydrohalide product differs from previous rubber hydrohalides. It may be emphasized further that under this present invention these results are accomplished not with expensive ethers and esters that do not swell rubber, but with relatively inexpensive aromatic or chlorinated aliphatic compounds as penetrants. Thus for example, benzene has been described as a typical penetrant, but chloroform has been mentioned as another illustrative penetrant, and toluene and ethylene dichloride may be mentioned likewise.

The subject matter of this present application contains certain features in common with those of allied application Serial No. 412,200.

While in accordance with the patent statutes we have set forth the principles of this invention and have illustrated a preferred practice thereof by specific example, it will now be apparent to those skilled in the art that modifications may be made within the scope of the appended claims.

What we claim is:

1. A process of producing vulcanized-rubber hydrohalide comprising reacting vulcanized rubber in solid form with gaseous material selected from the group consisting of hydrogen chloride, hydrogen bromide, and hydrogen iodide in the presence of penetrant in gaseous form capable of swelling the rubber.

2. A process of producing vulcanized-rubber hydrochloride comprising exposing vulcanized rubber in solid form to an atmosphere of gaseous hydrogen chloride and gaseous penetrant capable of swelling the rubber.

3. A process of producing vulcanized-rubber hydrohalide comprising exposing vulcanized rubber in solid form to gaseous material selected from the group consisting of hydrogen chloride, hydrogen bromide, and hydrogen iodide at about atmospheric pressure with gaseous penetrant capable of swelling the rubber.

4. A process of producing vulcanized-rubber hydrohalide comprising exposing vulcanized rubber in solid form to gaseous materials selected from the group consisting of hydrogen chloride, hydrogen bromide, and hydrogen iodide at about atmospheric pressure with gaseous penetrant capable of swelling the rubber, at temperatures about 20 to 30° C.

5. A process of producing vulcanized-rubber hydrohalide comprising exposing vulcanized rubber in solid form to gaseous material selected from the group consisting of hydrogen chloride, hydrogen bromide, and hydrogen iodide at about atmospheric pressure with gaseous penetrant capable of swelling the rubber, and then exposing the product to gaseous ammonia to obtain an acid-free product.

6. Process of forming finely divided vulcanized-rubber hydrohalide comprising exposing solid vulcanized rubber containing about 0.25 to 25 percent sulphur to gaseous material selected from the group consisting of hydrogen chloride, hydrogen bromide, and hydrogen iodide and to gaseous penetrant capable of swelling the rubber, and then milling the product vulcanized-rubber hydrohalide containing penetrant to convert the product to finely divided form.

7. A process of producing vulcanized-rubber hydrohalide of improved tensile strength comprising exposing vulcanized rubber in solid form to gaseous material selected from the group consisting of hydrogen chloride, hydrogen bromide, and hydrogen iodide and benzene, and then stretching the product to about 3 to 7 times its original length while containing about 20 percent by weight of benzene.

8. A process in accordance with claim 2, in which the penetrant is selected from the group consisting of aromatic and chlorinated aliphatic compounds.

9. A process in accordance with claim 2 in which the penetrant is benzene.

10. A process of producing vulcanized-rubber hydrochloride comprising exposing vulcanized rubber in solid form to an atmosphere of hydrogen chloride and gaseous penetrant capable of swelling the rubber in which the amount of penetrant absorbed in the vulcanized rubber during the exposure ranges from approximately 55% by weight of the vulcanized rubber to an amount equal to the weight of the vulcanized rubber.

HOWARD F. REEVES, Jr.
TROY M. ANDREWS.